H. W. WILLIAMS.
Improvement in Apple Corers and Slicers.
No. 123,540. Patented Feb. 6, 1872.
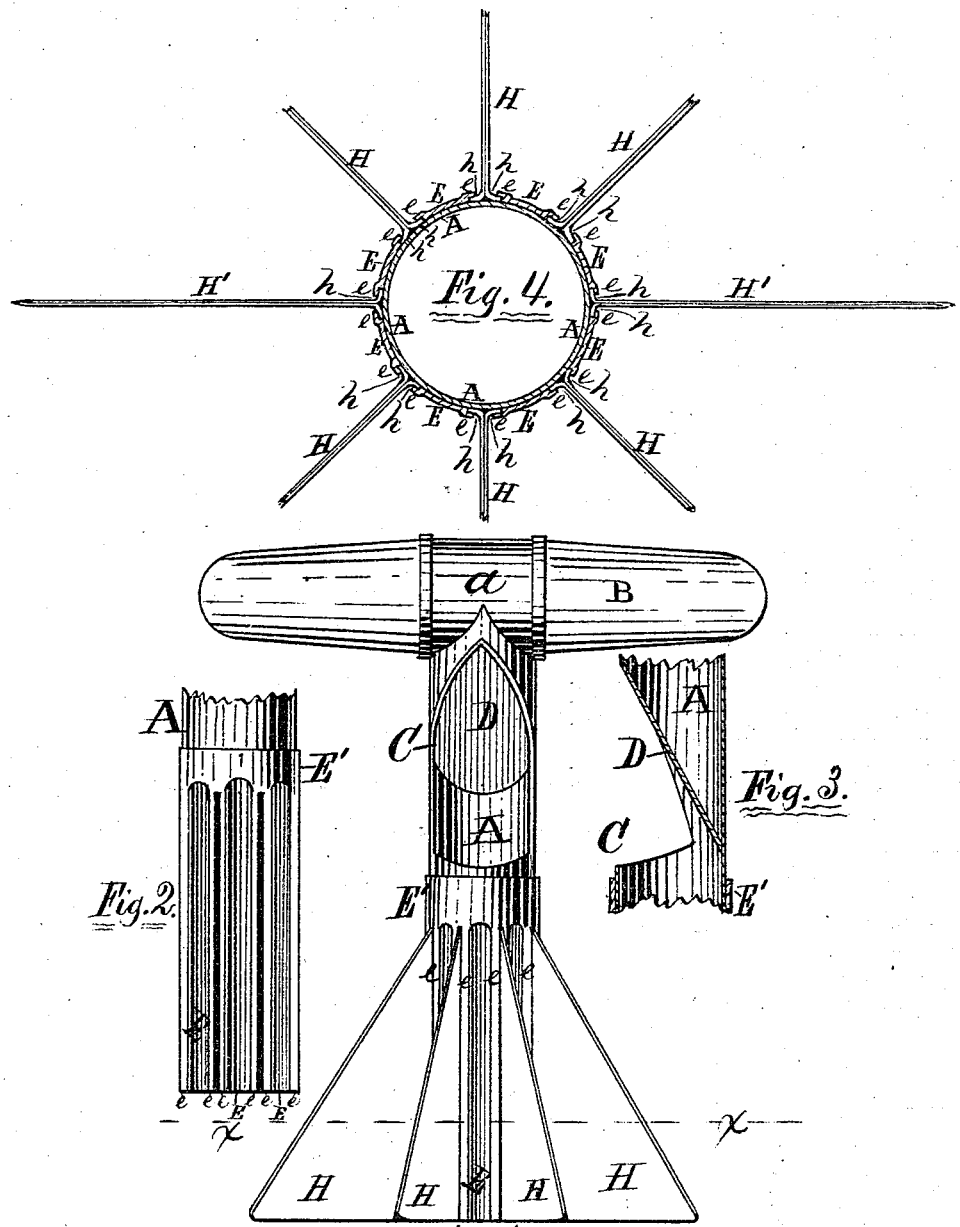
Witnesses:—
Platt R. Richards.
J. J. Tunnicliff.
Inventor,
Henry W. Williams,
by W. B. Richards,
his atty.

No. 123,540

UNITED STATES PATENT OFFICE.

HENRY W. WILLIAMS, OF GALESBURG, ILLINOIS, ASSIGNOR OF ONE-THIRD HIS RIGHT TO ION G. DIETERICH AND CHARLES H. HOOVER, OF SAME PLACE.

IMPROVEMENT IN APPLE-CORERS AND SLICERS.

Specification forming part of Letters Patent No. 123,540, dated February 6, 1872.

SPECIFICATION.

I, HENRY W. WILLIAMS, of Galesburg, county of Knox and State of Illinois, have invented certain Improvements in Apple-Corers and Slicers, of which the following is a specification:

Nature and Objects of the Invention.

My invention relates to improvements in that class of apple-corers and slicers in which a tube or circular cutter, made of tin or other suitable metal, is provided with knives projecting radially from its circumference; and the invention consists in so constructing the knives and tubular cutter that any number or all of the knives may be attached to or detached from the circular cutter or corer at pleasure, thus affording facilities for cutting the apple into any desired number of parts while being cored; or facilities for coring it without slicing at all; all as hereinafter fully described.

Description of the Accompanying Drawing.

Figure 1 is a side elevation of my invention with the slicing-blades in place. Fig. 2 is a side elevation of the lower end of the tubular cutter with the knives removed. Fig. 3 is a vertical sectional view of a detached part of Fig. 1. Fig. 4 is a horizontal sectional view of Fig. 1 on line $x\ x$. Figs. 1, 2, and 3 are the size of an ordinary machine. Fig. 4 is enlarged to double size.

General Description.

A represents a hollow cylinder provided with a ring, $a$, at its upper end, through which a handle, B, is inserted. C is a notch in the upper part of the cylinder A, and D is a diagonal plate back of notch C. E represents a series of plates arranged longitudinally on the outer surface of the cylinder A, their edges being turned up so as to form ledges $e$, as shown at Fig. 4. E' is a cylindrical plate arranged on the cylinder A above the plates E. These plates E E' may be formed separately or cut from one sheet of metal, as found most convenient. Letters H represent the blades, shown broken away at Fig. 4, except the two lateral ones, H' H'. Each blade is formed of a sheet of tin or other suitable metal, doubled and cut in a triangular shape, as shown at Figs. 1 and 4, the folded side being the hypothenuse, the lower or cutting-edge the base, and the side next the tubular cutter A the perpendicular. The two edges of each blade on the perpendicular sides are turned outward, forming flanges $h\ h$.

The Fig. 3 is a vertical sectional view from front to rear of that part of Fig. 1, to which it stands opposite.

The operation of my invention is as follows: The blades H are passed into position, shown at Figs. 1 and 4, by entering the flanges $h\ h$ beneath adjacent lugs $e\ e$ at the lower end of the cylinder A, then passing the blade H upward until its upper end strikes the blade E'. With the blades in position, the machine may be used to core and to cut the apples into pieces in the ordinary manner with this class of corers and cutters. The number of pieces into which the apple is cut may be regulated by the number of blades used; and by removing all of the blades the tubular cutter A may be used for simply coring the apple, for baking purposes, &c. Each core in operation presses its predecessor forward within the tube A until the uppermost one strikes the plate D and is by said plate deflected from its course and discharged through opening C.

Claim.

I claim an apple-corer and slicer, constructed substantially as described, with removable blades H, arranged to operate with plate or plates E E' and tubular cutter A, as and for the purpose specified.

HENRY W. WILLIAMS.

Witnesses:
 P. R. RICHARDS,
 J. J. TUNNICLIFF.